United States Patent
Du (10) Patent No.: US 11,474,066 B2
(45) Date of Patent: Oct. 18, 2022

(54) FOLDABLE AND INTRINSICALLY SAFE PLATE CAPACITIVE SENSORS FOR SENSING DEPTH OF SOLIDS IN LIQUIDS AND SENSING DEPTH OF TWO DIFFERENT TYPES OF LIQUIDS IN HAZARDOUS LOCATIONS

(71) Applicant: Derrick Wei Du, San Bruno, CA (US)

(72) Inventor: Derrick Wei Du, San Bruno, CA (US)

(*) Notice: Subject to any disclaimer, the term of this patent is extended or adjusted under 35 U.S.C. 154(b) by 218 days.

(21) Appl. No.: 16/862,343

(22) Filed: Apr. 29, 2020

(65) Prior Publication Data

US 2021/0131992 A1 May 6, 2021

Related U.S. Application Data (60) Provisional application No. 62/929,106, filed on Nov. 1, 2019.

(51) Int. Cl.
*G01N 27/22* (2006.01)
*G01F 23/263* (2022.01)

(52) U.S. Cl.
CPC ......... *G01N 27/226* (2013.01); *G01F 23/266* (2013.01)

(58) Field of Classification Search
CPC .............. G01N 27/226; G01F 23/266; C02F 2209/008
See application file for complete search history.

(56) References Cited

U.S. PATENT DOCUMENTS

| | | | |
|---|---|---|---|
| 7,492,272 B1* | 2/2009 | MacDonald | G01F 23/2925 340/603 |
| 2002/0175814 A1* | 11/2002 | Wadlow | G01D 5/24 340/562 |
| 2016/0083265 A1* | 3/2016 | Wright | B01D 29/606 210/741 |
| 2018/0016096 A1* | 1/2018 | Krishnamurthy | B65F 1/14 |
| 2018/0164240 A1* | 6/2018 | Seckler | G01N 1/14 |

* cited by examiner

*Primary Examiner* — Alvaro E Fortich
(74) *Attorney, Agent, or Firm* — Derrick Du (57) ABSTRACT

The present invention comprises a novel foldable and intrinsically safe plate capacitive sensor to measure liquid depths, solids in liquid depths, and two different liquids depths. This invention is used in onsite wastewater management systems (OWTS) to monitor depths of solids, oil, and effluent in a wastewater tank. The plates are configured to allow for solids, liquids and gases to surround the plates. A number of plates are hung in series from near the OWTS tank lid to at least 18 inches below the output baffle to measure the different materials at different depths in the OWTS tank. The capacitive sensors are capable of use with various materials to measure solids, oil, and effluent depths in an OWTS tank.

15 Claims, 11 Drawing Sheets

System Architecture

FIG. 1: System Architecture

FIG. 2: System Architecture Block Diagram

FIG. 3: Sensor Design

FIG. 4: Capacitance Plate Side

FIG. 5: Sensor Segment Side 1

FIG. 6: Sensor Segment Side 2

FIG. 7: Hinge

FIG. 8: Separation Guide

FIG. 9: Parallel Plate Capacitor

FIG. 10: Liquids Depth Sensing

FIG. 11: Solids and Liquids Depth Sensing

FIG. 12: Alternative Plate Orientation

FOLDABLE AND INTRINSICALLY SAFE PLATE CAPACITIVE SENSORS FOR SENSING DEPTH OF SOLIDS IN LIQUIDS AND SENSING DEPTH OF TWO DIFFERENT TYPES OF LIQUIDS IN HAZARDOUS LOCATIONS

FIELD OF THE INVENTION

The present invention relates to foldable plate capacitive sensors. In particular, the invention relates to a plate capacitive sensor that is configured to be intrinsically safe and can be used in hazardous locations. These sensors are foldable such that multiple plates are connected in series with hinges and plates are kept a uniform distance apart. The two plates of the capacitive sensor are separated a fixed distance to allow for solids and liquids to surround the plates. These sensors include methods to discern levels depths (e.g., accumulations and amounts) of solids in liquids and depths of two different liquids with different dielectrics and densities.

BACKGROUND

Onsite wastewater treatment systems (OWTS) have been difficult, if not impossible, to regulate and enforce. Alex Kvidt from Ottertail Water Management District in Minnesota stated that it takes one full time employee to manage 1500 OWTS. Two of the most prevalent OWTS include septic tanks and grease interceptors.

Use of Septic (Septic systems) has steadily increased in new residential homes due to exurban expansion. Septic has been an active part of home development for generations and an estimated 25% of all residential homes in the USA are utilizing Septic. Septic can operate for decades when properly maintained. However, Septic maintenance is necessary for Septic to properly function and to ensure the grey and black water in the systems are recycled safely back into the environment.

Septic maintenance includes pumping out the septic tank when solid and/or oil depths are high and regular inspections of the tank and drain field. Several state studies have shown maintenance rates in the 46-50% range. These results closely aligned with the failure rates of OWTS at 10-50%. OWTS failures result in environmental, health and infrastructure impacts.

A 2008 study from Kansas State University shows a $4.3B loss annually due to environmental impacts of water pollution by phosphorus and nitrogen. The study accounts for losses due to increased operating costs at municipal water plants, decreased lakefront property values, and losses of recreational water industries. The pollution creates increased costs at Municipal water treatment plants. Lakefront property values decrease when a lake becomes more hazardous to swim in. Recreational water industries like fishing or boating also see significant decreases in revenue.

A 2010 study from the CDC shows an estimated $539M is spent annually on hospitalizations due to common and preventable waterborne diseases. According to Galveston County Health District in Texas, Septic are the largest of all contributors of wastewater to the ground and are the most frequently reported source of groundwater contamination.

Septic failures increase infrastructure costs. When Septic is not maintained, solid waste exits the Septic tank and enters the leach field, causing a biomat to form in the leach field and the leach field to fail. Based on the number of households with Septic, the current failure rates, and with an average cost of leach field replacement at $7500, use of Septic results in a $74B infrastructure cost.

Fats, Oils and Grease (FOG) has been a consistent issue with municipal wastewater infrastructure. Food Service Establishments (FSE) are major contributors of FOG, and grease traps and grease interceptors have been utilized to retain FOG before it reaches the municipal wastewater infrastructure. Approximately 50% of all Sanitary Sewage Overflows (SSO) are attributed to FOG.

Similar to Septic, grease interceptors need to be pumped out regularly to continue to properly function. Industry standard has been to pump out grease interceptors every three months regardless of the current depths in the tank. This could be too early or too late, depending on how the FSE utilizes the grease interceptor.

For any OWTS method, municipalities have incentives to enforce regulations to ensure these OWTS solutions are compliant. Municipalities generally don't have the manpower or budget to inspect each OWTS. Automating the reporting process and the state of the OWTS would simplify this process. Knowing the solid, oil and effluent depths would enable municipalities to understand the state of each OWTS. Adding in an understanding of wastewater usage in conjunction with depths of solids and oils enables estimations of solids exiting the tank and predictive maintenance of downstream components. One example would be estimating quantities of oil exiting the tank would enable SSO risk maps and scheduled cleanings of sewer piping before a SSO occurs.

Existing prevalent techniques developed for monitoring OWTS are only able to measure the overall effluent level in the tank and unable to measure solid, oil and effluent depths needed to know when maintenance is necessary. These techniques may include ultrasonic sensors and floaters.

Ultrasonic sensors are mounted to the top of the tank detect the wastewater level. These sensors are expensive and installation expertise is necessary for proper placement to get accurate readings.

Floaters are installed at a specified height in the tank to determine when effluent levels surpass the respective fixed height. Floaters are mechanical devices and thus are more prone to breakage.

More recently, other existing techniques for monitoring oils in tanks have been developed. These capacitive or conductance sensors that are installed at a specified height to determine when the level of oils surpasses the respective fixed height. These discrete sensors, however, require more sensing points to provide continuous level sensing (i.e., more sensors and more locations), and do not sense the levels of liquids, solids, and oils separately.

New developments with ultrasonic sensors that are in the wastewater have been used to measure solid, oil, and effluent depths. Unfortunately, these solutions are expensive, inaccurate due to extraneous reflections from suspended solids and unseparated grease, have a complex installation process, and are unreliable due to sensor complexity.

Therefore, a need exists in OWTS monitoring for a sensor that is reliable, low power, affordable, easy to install, easy to ship and can measure solid, oil and effluent depths in an OWTS tank.

The present invention is noted to be used in conjunction with OWTS, but this does not preclude other applications both in waste/wastewater management systems capturing solid, oil and effluent including bio-reactors, pit latrines, portable toilets, sand-oil separators and non-waste management systems including measuring suspended sediment in waterways to understand erosion rates, measuring sediment depths in beer to more accurately supply standardized quality of beer, measuring sediments in orange juice to package the juice correctly, measuring sediment depths in wine to ensure filtering systems are working properly, and measuring sediment depths in water heaters to ensure the heater does not overheat and prematurely fail.

BRIEF SUMMARY OF THE INVENTION

The present invention comprises a novel foldable and intrinsically safe capacitive sensors for detecting depths of solids in liquids and depths of two different types of liquids with different dielectric values. The solids, liquids and gases all contain impurities at different degrees of severity.

Capacitive sensors have inherently been unsafe in hazardous environments. To make them intrinsically safe for hazardous environments, the sensor circuits need to be designed to limit voltages, currents, and frequency to specific thresholds. Additionally, to make the sensors safe, sensor capacitance plates need to be distanced based on: 1. circuit maximum threshold voltages, currents, and frequency 2. minimum area of the plates needed to sense the solids and liquids, 3. maximum difference in dielectrics of the materials being sensed, 4. shortest discharge time, 5. maximized plate charge, and 6. allow solids to surround the plates and still be able to detect depths of solids in liquids and depths of two different types of liquids.

Capacitive sensors have inherently been mounted to plates that are separated with a known material that has a known dielectric constant. To make the sensors foldable, each plate consists of multiple segments in series and hinges connecting each segment. In other embodiments, the capacitive sensors would be mounted to long flexible plates made from sheet metal or metal foil.

Since the plate capacitor needs to allow for solids and liquids to surround each of the plates, each plate needs to be properly distanced from their corresponding counterpart plate. Plates are separated a distance up to 100 mm by a separation guide or plates are placed side by side. Separation guides or hinges are placed every 25-1500 mm along the plate capacitors. The capacitor sensors apply depth sensing to measure the amount of accumulated material of a mixed waste material, separately sensing liquids, oils, effluent, and/or solids.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these individual techniques include various benefits and each technique can also be used in conjunction with one or more, or in some cases all, of the other disclosed techniques. Accordingly, for the sake of clarity, this description will refrain from repeating every possible combination of the individuals steps in an unnecessary fashion. Nevertheless, the specification and claims should be read with the understanding that such combinations are entirely within the scope of the invention and the claims.

New methods for liquid and solid depth sensing and how to create an intrinsically safe sensor are discussed herein. In the following description, for purpose of explanation, numerous specific details are set forth in order to provide a thorough understanding of the present invention. It will be evident, however, to one skilled in the art that the present invention may be practiced without particular aspects of these details.

The present disclosure is to be considered as an exemplification of the invention, and is not intended to limit the invention to the specific embodiments illustrated by the figures or description below.

Figure 1:
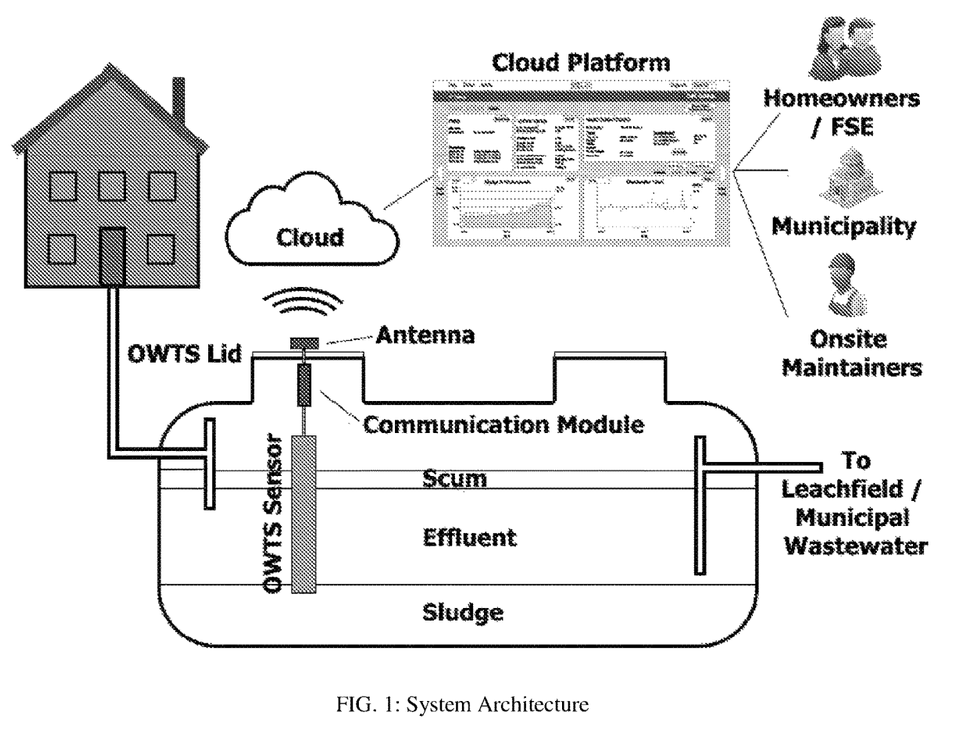
FIG. 1 is an exemplary illustration of the system architecture and where each component will be installed in an OWTS in accordance with one embodiment of the invention.
Figure 2:
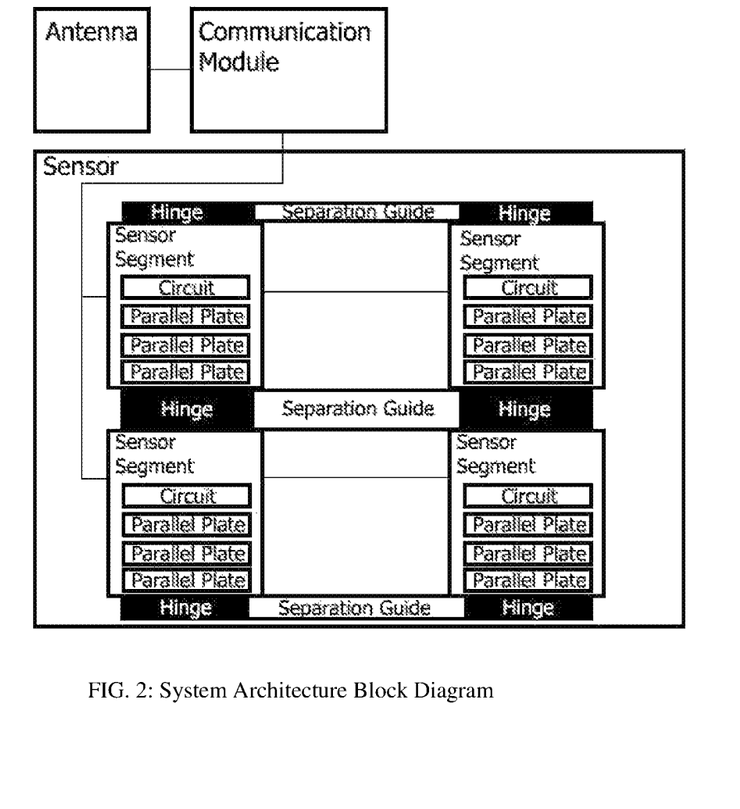
FIG. 2 is an exemplary illustration of the system architecture and major functions associated with each component in accordance with one embodiment of the invention.

FIG. 1 and FIG. 2 are exemplary illustrations of a system architecture for the capacitive sensors. FIG. 1 depicts each component installed in an OWTS. FIG. 2 depicts major functions associated with each component.

This diagram depicts the path wastewater takes from the house/FSE into the input baffle of the OWTS. The sensor extends through the solids, oils and effluent in a tank to measure the respective depths of the solids, oils, and effluent. The sensor is connected to the communication module through an external connector on the communication module. The state of each OWTS is transmitted to a cloud platform.

The system may be installed in a new OWTS or retrofit in an existing OWTS. The system may be installed after being pumped out or with existing wastewater in the tank. The communication module is placed inside or outside the tank. To install the communications module, a single hole is drilled for the sensor cabling or the antenna cabling along the side of the OWTS riser. If the communications module is installed inside the OWTS, the communications module is installed on the side of the OWTS riser, directly below the lid.

Placing the communication module inside the tank moderates temperatures for the electronics and limits design variations that rely on the lid to be a specific material and thickness (lid materials may be concrete, steel, or plastic that change thickness). Placing the communication module outside the tank enables ease of battery replacement and limits external components needed, in particular the antenna. When the communication module is installed inside the tank, an antenna is needed outside of the tank.

The system is battery or AC line powered. For maintenance, the batteries are replaced and the sensors need to be cleaned or replaced at every pumping. Cleaning ensures that there are no solids attached to the plates. Further, the sensors may also be replaced during maintenance.

The cloud platform in conjunction with the communication module enables Over the Air (OTA) updates to the module for changes to sensor and communication configurations. The cloud platform communicates via web portal, mobile app, text, and/or email with home owners, municipalities, onsite maintainers, and OWTS designers on maintenance notifications, estimated maintenance activities, regulatory paperwork, and pumping schedules and optimized routes for pumpers.

Figure 3:
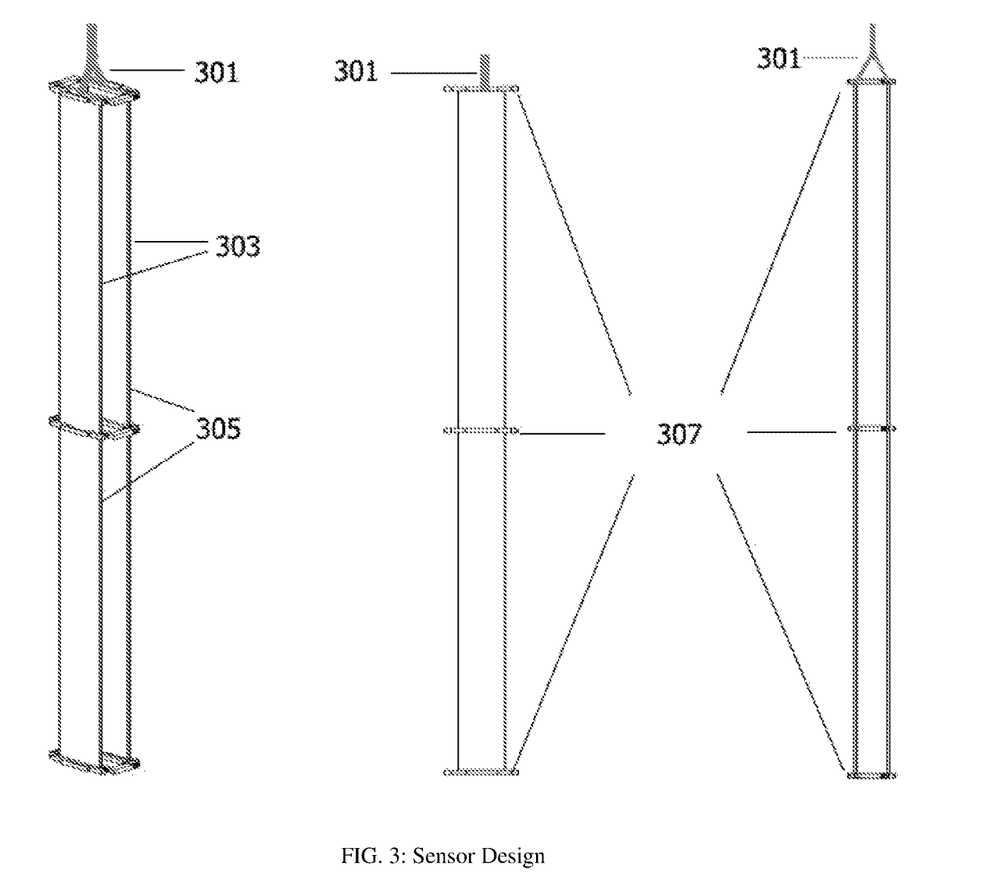
FIG. 3 is an exemplary illustration of the sensor system and sensor setup process in accordance with one embodiment of the invention.

FIG. 3 is an exemplary illustration of the sensor and sensor setup process. The sensor may include two plates that are separated a set distance. The plates may be parallel plates, side by side, or via reference charge. The plates 303 are setup in a parallel plate configuration. Each side of these plates may be covered in a jacketing 305. Separation guides 307 are utilized to ensure the plates are a set distance apart. Each of the guides is installed between 25 and 300 mm from each other. The separation guides hold the parallel plates up to 200 mm uniform distance from each other. Each side of the parallel plates has particular locations for separation guide installation.

The sensor is attached to the communication module with a cable bundle 301. When installing, the sensor is lowered into the OWTS tank. The sensor will have marks denoting where the sensor will be aligned with respect to the tank baffles. Once the sensor is lined up with the baffles, the rest of the excess cable is wrapped together and tied to a location in the OWTS tank but under the lid.

The length of the sensor may range from 762 mm to 3810 mm, not including the sensor cabling. The bottom of the sensor may contain a weight of up to 0.5 kg to ensure the sensor hangs into the tank through turbulent water.

Since the sensors and communication module are installed in a hazardous environment, they are designed to be intrinsically safe. In an OWTS tank, the predominant gas produced is methane. The Minimum Ignition Energy (MIE) of methane is denoted as 0.28 to 0.3 mJ. The "charge" circuitry limits voltages from 0 to 8 V. The parallel plates are held a fixed distance apart, up to 200 mm. To further prevent the plates from touching, each side of the capacitor plates have a jacket or shielding a minimum of 0.05 mm thick. The maximum length of a plate capacitor is 1.5 meters and the maximum width is 0.05 meters. The dielectric constant of methane at 0 degrees C. is 1.01918. Given the charge equation of $E=(\frac{1}{2})*$dielectric of methane*Area of plate/distance between parallel plates*$V^2$, this results in a total charge of 0.216 mJ, which is below the MIE for methane. Additionally, the plate shielding is chosen for low dissipation factors and high resilience in hazardous environments.

Figure 4:
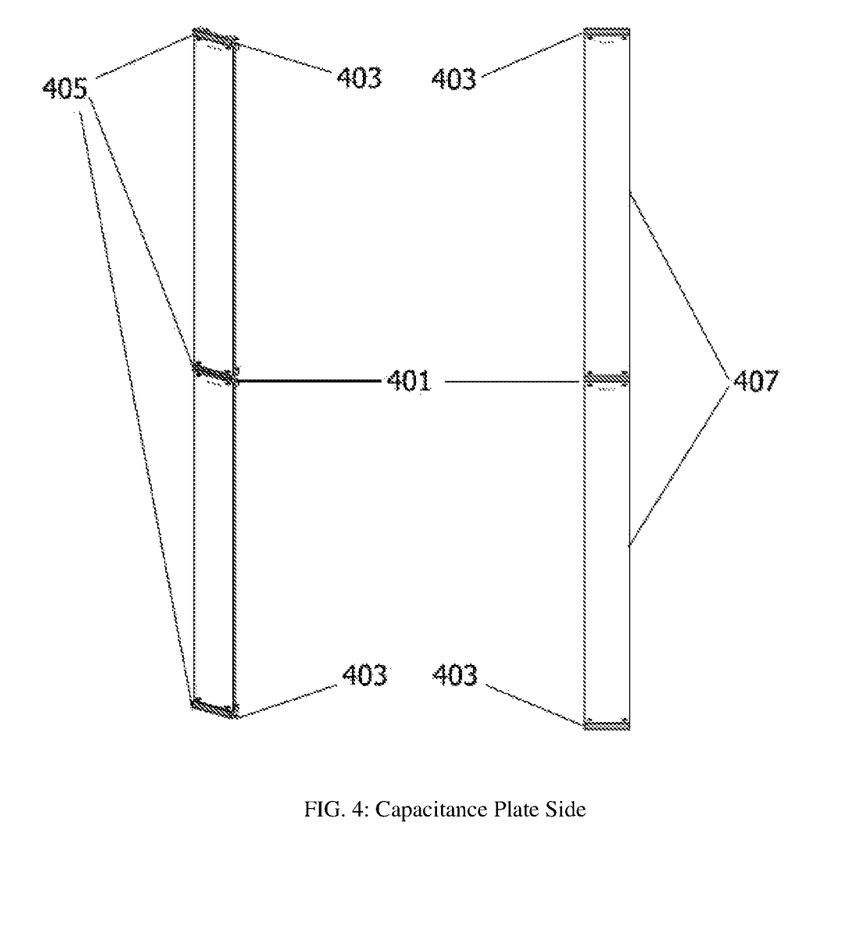
FIG. 4 is an exemplary illustration of one side of the plate capacitor and how the components are constructed in accordance with one embodiment of the invention.

FIG. 4 is an exemplary illustration of one side of the parallel plate capacitor and how the components are constructed. One side of the parallel plate capacitor is broken into one or more flexible or non-flexible sensor segments 407. For non-flexible sensor segments, each segment is connected to the next sensor segment with a foldable hinge 401. When there is no hinge on a sensor segment end, there are sensor segment end points 403. Both the sensor segment end points and hinge are designed for a separation guide 405 to connect to them and limited the x, y, and z-axis movement when connected. Flexible sensor segments could also be utilized without a foldable hinge. Each sensor segment may be up to 3500 mm in length.

Each sensor section (and corresponding cabling) is shielded in a jacket made of Propylene, Polyvinyl Chloride (PVC), Polyethylene (PE), Chlorinated Polyethylene (CPE), Rulan, Halar (ECTFE), Polyurethane (PUR), Polyolefin, Tezfal, Teflon, or Cross-linked Polyethylene (XLP/XLPE).

Figure 5:
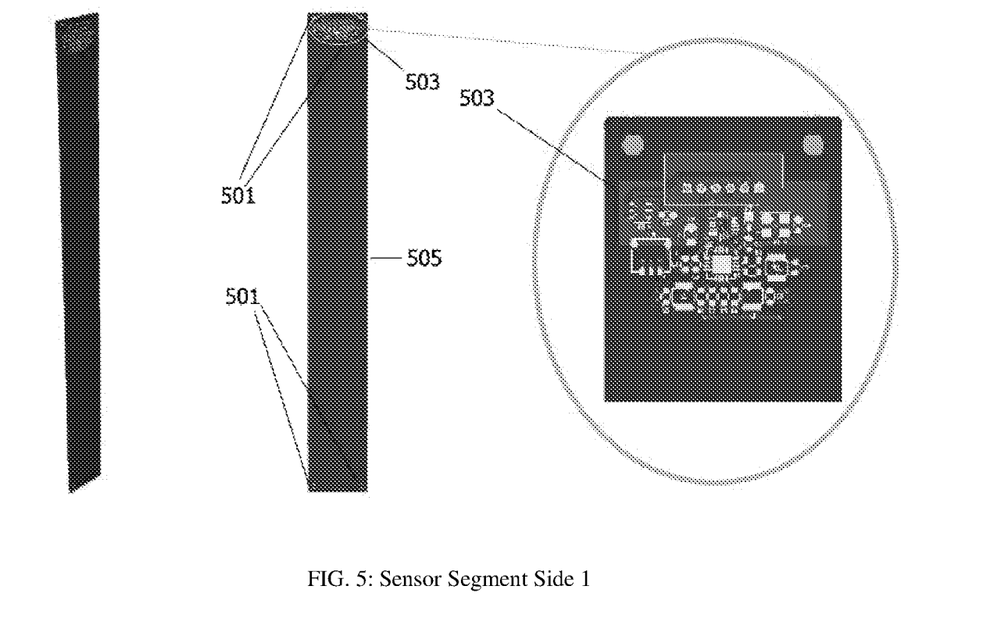
FIG. 5 is an exemplary illustration of one side of a single segment on one side of the plate capacitor, the various sensors included and the design characteristics of each of the plates as part of the segment in accordance with one embodiment of the invention.
Figure 6:
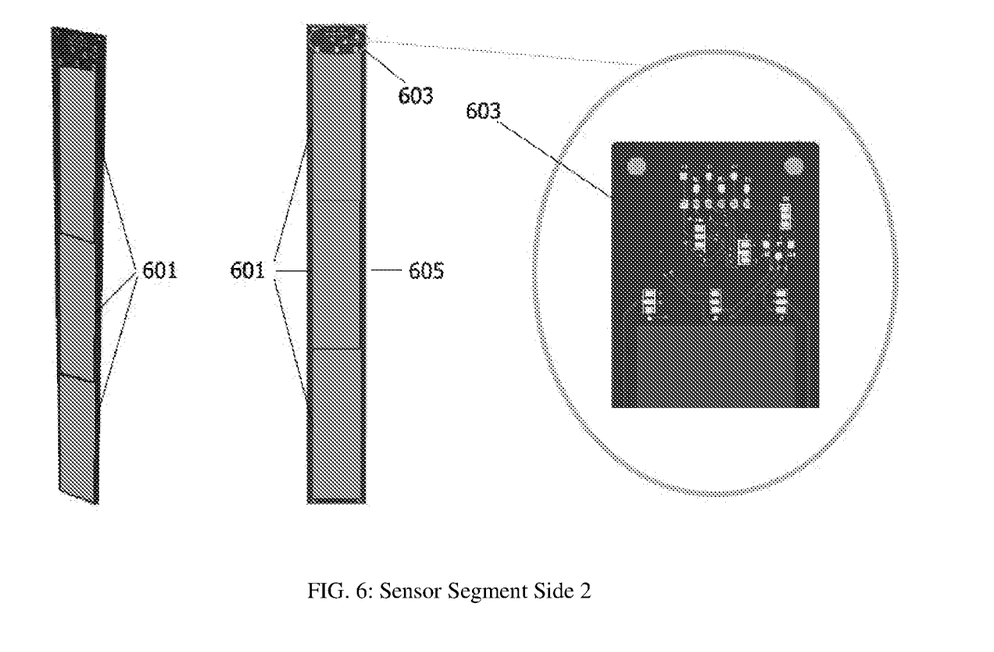
FIG. 6 is an exemplary illustration of another side of a single segment on one side of the plate capacitor in accordance with one embodiment of the invention.

FIG. 5 and FIG. 6 are exemplary illustrations of a single sensor segment on one side of the plate capacitor, the various sensors included and the design characteristics of each of the plates as part of the sensor segment. Sensor segments are connected to each other through hinges. Holes 501 are in each sensor segment to connect to hinges and sensor segment end points. Each sensor segment consists one or more plates 601 of flat metal foil or film no thicker than 10 mm. Each plate is no wider than 0.05 meters and no longer than 1.53 meters. The plates may be circular, oval, rectangular, zig-zag, blocks or a combination of shapes. The plates may be sequential or overlapping.

Each sensor segment may have integrated circuits 503 and 603, including the capacitance sensing circuitry. Capacitance sensing circuitry may also be placed in the communications module. It is to be understood that several techniques may be used to increase the accuracy of the capacitance readings including various combinations of temperature sensors for dielectric constant changes with temperature, accelerometers and gyrometers for understanding "in use" durations by measuring water movements, and salinity sensors to characterize the wastewaters dielectric constant.

Each sensor segment of the plate capacitor (and corresponding cabling) is shielded with Polyurethane (PUR) and/or Epoxy Resin 505 and 605.

Figure 7:
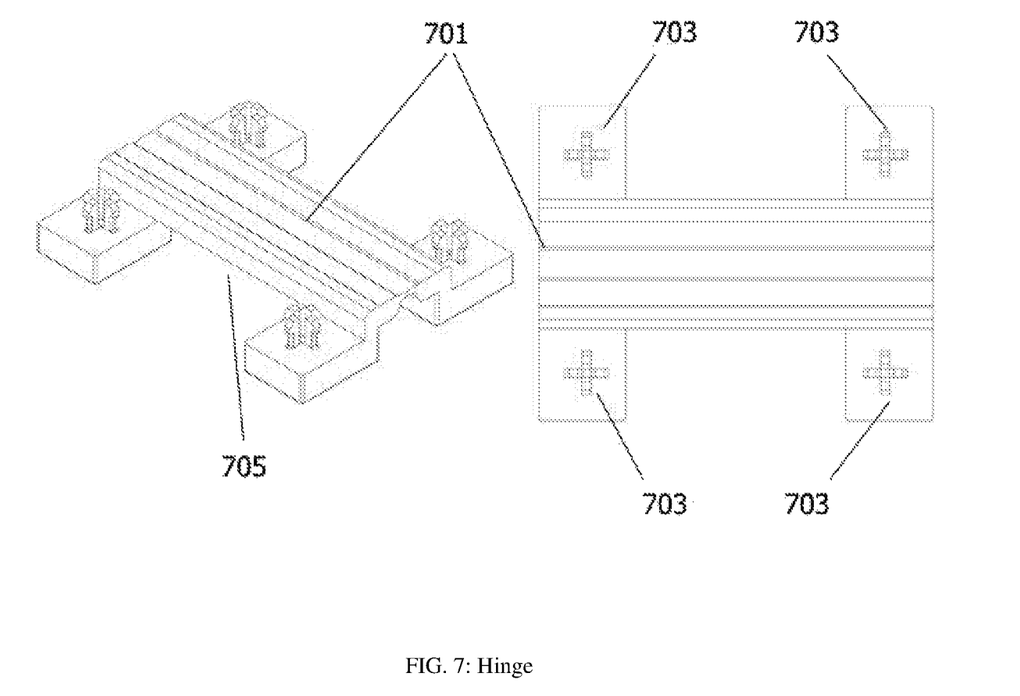
FIG. 7 is an exemplary illustration of a hinge connecting each parallel plate capacitor segments and each parallel plate capacitor end points in accordance with one embodiment of the invention.

FIG. 7 is an exemplary illustration of a hinge connecting each plate capacitor segments and each plate capacitor end points. The hinge may be a living hinge 701 made from polypropylene, nylon, or polyethylene. The hinge has openings 705 for wires to easily pass from one segment to the next. The hinge is connected to the board with rivet clips, retainer clips, expansion clips, expansion screws, or nuts and screws 703 installed through holes on the sensor segment 501. The hinge is designed to mate with the separation guide to limit movements between segments in three axis.

Figure 8:
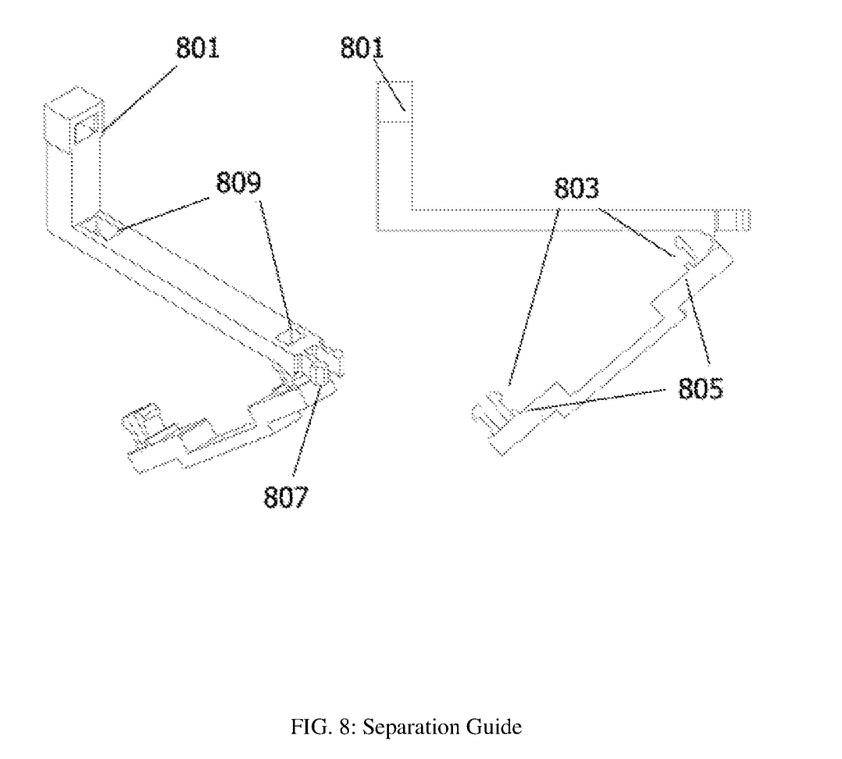
FIG. 8 is an exemplary illustration of a separation guide connected to each hinge in accordance with one embodiment of the invention.

FIG. 8 is an exemplary illustration of separation guides connected to each hinge and sensor segment end point. The separation guides main purpose is to create the fixed distance between the two plates of the capacitor. Separation guides are constructed with two identical components that are connected to each other and each side of the parallel plate capacitor. The separation guide is made from polypropylene. The separation guide may be attached to each other with a rivet clips, retainer clips, expansion clips, expansion screws, or nuts and screws. In one embodiment of the separation guide, a female retainer 801 is a mating point for the connection between separation guides. In one embodiment of the separation guide, a male retainer 807 is the corresponding mating point for the connection between separation guides. The separation guides are attached to each side of the parallel plate capacitors by locking in place over the hinge or sensor segment end points with a built in rivet clip, retainer clip, expansion clip, expansion screw, or nuts and screws. In another embodiment, another female retainer 803 is a mating point for the connection over the hinge or sensor segment end point. In another embodiment, another male retainer 809 is a mating point for the connection over the hinge or sensor segment end point. The mating points 805 mate with the hinge or sensor segment end points to limit 3-axis movements.

Figure 12:
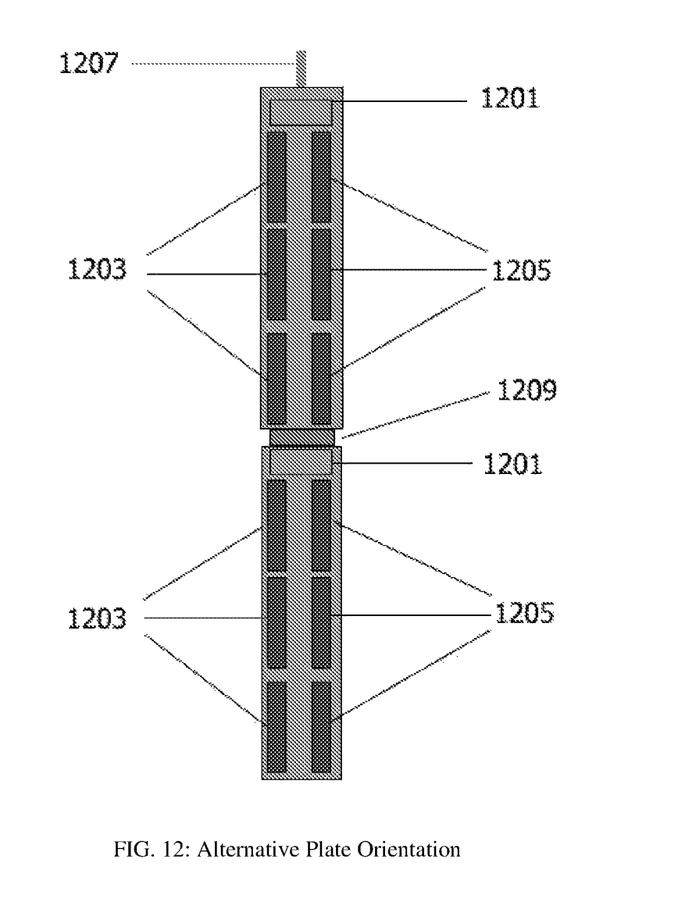
FIG. 12 is an exemplary illustration of an alternative sensor system with a side by side plate setup in accordance with one embodiment of the invention.

FIG. 12 is an exemplary illustration of an alternative sensor system with a side by side plate setup. This approach does not require separation guides, but instead has plates built onto one substrate and plates are placed side by side. In the side by side configuration, the sensor is attached to the communication module with a cable bundle 1207. The circuitry 1201, is located at the top and one side of the capacitor plates 1203 are next to their respective counterpart capacitor plates 1205. A hinge 1209 is needed to connect consecutive sensor segments and locking mechanism is needed to ensure the hinge is set at 180 degrees when the sensor is installed in the OWTS tank. In one embodiment, the capacitive sensor device includes 4 capacitors that have plates side by side with 3 mm fixed separation between each capacitor plate. Each capacitor plate is 25 mm wide and 100 mm tall and each capacitor is lined up consecutively to create a 400 mm tall by 53 mm wide set of capacitors. Each of these capacitors are fixed on a printed circuit board. This circuit board is one of three circuit boards that are connected together with hinges creating a sensor that is approximately 1200 mm tall and 53 mm wide.

Figure 9:
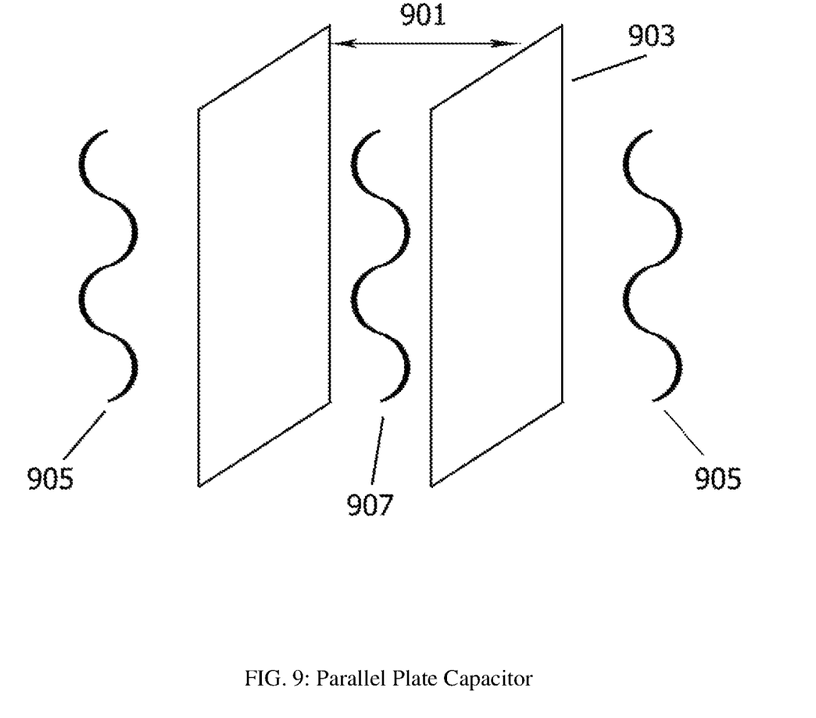
FIG. 9 is an exemplary illustration of a Parallel Plate Capacitor and the attributes that define the capacitance value between the parallel plates in accordance with one embodiment of the invention.

FIG. 9 is an exemplary illustration of a Parallel Plate Capacitor and the attributes that define the capacitance value between the parallel plates. The major factors include dielectric materials between the plates 907, the dielectric materials around the plates 905, the movement of those dielectric materials, the distance between the plates 901, the dimensions of the plates or the area of the plates 903, and the temperature (impacts dielectric materials).

In OWTS, there are up to three types of materials: solids, oils, and effluent. The dielectric constant of solids in wastewater is likely between 1 and 20 because there is water content. The dielectric of oil is between 1 and 5. Finally, the dielectric constant of gas is approximately 1. All the dielectric values are significantly different from the dielectric constant of the effluent, 80+. By understanding the transition state the tank is in, the depths of the tank can be discerned from the differences in dielectric constant. For example, if the tank is empty and still filling with wastewater, the sensor will be predominantly comparing effluent with gas.

It is to be understood that several methods may be used in defining OWTS "transition states" of when the tank is empty, when the tank if being filled, and when the tank is full. While in each of these "transition states", it is understood that several methods may be used in defining when the tank is "in use" and when the not "in use". "In use" durations are calculated when effluent is detected to have been entering the tank. The combination of these "transition states" will also define when wastewater is being drained to the leach field.

The "tank empty" state can only be entered after batteries have been changed or the sensor readings are showing capacitance values with dielectrics constants consisting of only gas. This state is important to begin counting duration from the beginning of "tank empty" state to the beginning of "tank filling" state. This duration is used to estimate rate of change of effluent, oil, and solids. The duration in the "tank empty" state with the rate of change of effluent depth is a critical factor in calculating "high water usage".

The "tank filling" state is entered when the lowest plate begins to sense oil/effluent. In the "tank filling" state, the estimations of dielectric constants of gas, oil, effluent and solids are all being calculated. The estimations in rate of change of gas, oil, effluent and solids are also all being calculated. These values provide insights into accuracy of sensors, standard deviation of sensors, "in use" durations, estimated effluent depth which provide the end goal of knowing when maintenance is needed across all failure conditions.

The "tank filled" state is entered into during normal operations. This is when the top sensor measures no further rise in effluent depths for 1-14 days while the accelerometers and gyrometers are still measuring wastewater "in use" durations. This is when finalized estimations for dielectric constants of gas, oil, effluent and solids are made. Finalized estimations for rate of change of gas, oil, effluent and solids depths are made. Estimated effluent depth will be finalized at this point as well.

Effluent depth for "tank filled" state is also estimated based on install location of sensor. For example, effluent depth is 1.67 times the output baffle height. When the sensor is aligned with the output baffle, an estimation of the effluent depth is set.

As the wastewater travels into the tank, the wastewater in the tank becomes more turbulent and turbidity increases. When the wastewater stops coming in through the input baffle, the wastewater will settle and the solids and oil will begin to separate from the liquids forming the solids and the effluent respectively. The grease and oils will float to the top to form the oil layer. In particular, when defining when the tank is "in use", there are degrees of "in use" based on the turbidity and turbulence in the effluent and degrees of fluctuations read by the sensor system. It is to be understood that several methods may be used in defining an "in use" state. In particular, for "in use" accelerometers and gyrometers are placed in the sensor to measure sensor vibrations or sway or on the baffles to detect effluent movement.

Each household is different and what materials are placed in the OWTS will also be different. When the tank is filling and full, configurations for rate of water usage, dielectric constant of effluent, dielectric constant of solids, dielectric constant of gas and dielectric constant of oil, are used to increase sensitive parameters in calculating the depths of oil, effluent, and solids. Sensitivity parameters may include signal frequency, AC voltage, DC voltage, age of capacitor, and temperature.

It is to be understood that several methods may be used in defining OWTS "notification states". "Notification states" are the states that OWTS users are interested in knowing. "Notification states" include 1) overflow: solids warning, solids alarm, oil warning, oil alarm, solids and oil warning, solids and oil alarm, and output blockage; 2) leak; 3) detrimental materials: detrimental chemicals and detrimental usage; and 4) hydraulic retention.

Overflow notifications rely primarily on depths of solids, oils, and effluent in the tank. Leaks and detrimental materials primarily rely on rates of change in depths of solids, oils, and effluent in the tank. Hydraulic retention primarily rely on "in use" durations.

Figure 10:
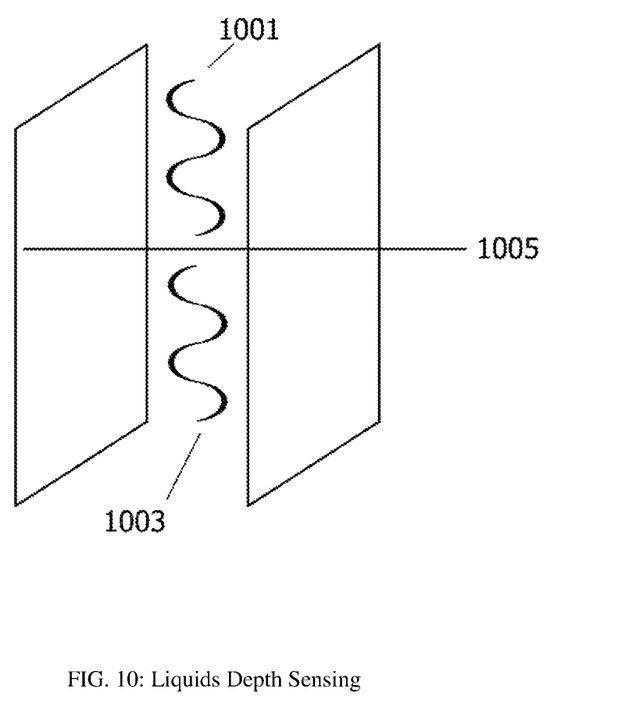
FIG. 10 is an exemplary illustration of how liquids with two dielectrics would impact the capacitance of the parallel plate capacitors in accordance with one embodiment of the invention.

FIG. 10 is an exemplary illustration of how liquids with two dielectrics would impact the capacitance of the capacitance. In the following equations, the distance between the plates is characterized by d, the area of the plates is characterized by A and the dielectric materials are characterized by E. The dielectric materials between the plates have the most significant impact on the electric field, thus the capacitance between the plates, and the surrounding materials will also influence the electric field. The two liquids need to have different dielectric constants and densities, resulting in the two liquids separating over time. If liquid 1 1001 has dielectric constant E1 and liquid 2 1003 has dielectric constant E2 and given the depth of liquid 2 to the total liquid depth 1005 is measured with R, the capacitance from the two plates would be calculated through the equation $(E1*(A*R)/d)+(E2*(A*(1-R))/d)$, given d is the distance between the plates and A is the area of a plate. This equation can also be written with $1/(2*Pi*freq*Cap\ Reactance)$.

Figure 11:
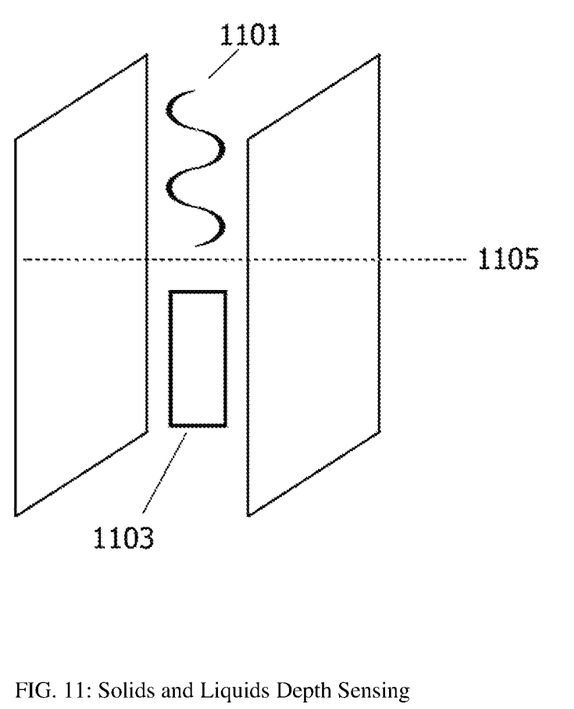
FIG. 11 is an exemplary illustration of how solids in a liquid would impact the capacitance of the parallel plate capacitors in accordance with one embodiment of the invention.

FIG. 11 is an exemplary illustration of how solids in a liquid would impact the capacitance. If liquid 1101 has dielectric constant E1 and solid 1103 has dielectric constant E2 and given the depth of solids to the total solid/liquid depths 1105 is measured with R, the capacitance from the two plates would be calculated with the same equation as in FIG. 10: $(E1*(A*R)/d)+(E2*(A*(1-R))/d)$.

Solids warnings and alarms are derived from solids depths. The dielectric constant of solids is approximately 1-20 in normal operating conditions. The effluent dielectric constant is 80+ in normal operating conditions. When measuring capacitance, the dielectric constant impacts the calculations through this equation: Capacitance=(Area of plate/distance between plates)*dielectric constant of material between plates. This equation can be used to derive the Capacitance across two different materials would be: Capacitance=(Area of plate/distance between plates)*((% depth of material 1)*(dielectric constant of material 1)+(% depth of material 2)*(dielectric constant of material 2)). This significant difference in dielectric enables the depth of the solids to be detected. As solids increase, the solids build up on the bottom of the tank. The bottom of the sensor is at least 450 mm below the bottom of the output baffle. In the case where multiple capacitors are used in the sensor, solids depths are measured based on the lower set of capacitors. Each capacitor is a known length and the depth of solids is known based on the number of capacitors that are surrounded with solids and the next highest capacitor (S1) that is partially surrounded. A calculation of the solids depth can be generated by calculating the summation of the length of each capacitor and the estimated percentage coverage of solids from the capacitance reading on the partially surrounded capacitor. Solids warnings and alarms are set for solid depths at least 150 mm below the output baffle. It is to be understood that several methods may be used to calculate solids depths including various combinations of temperature, estimated dielectric constants of effluent, estimated dielectric constants of solids and "in use" durations. For example, if a plate capacitor in the sensor is surrounded by solids up to 40% of the total height and surrounded by effluent for the remaining 60%, this results in a capacitance reading of sensor S1 as (Area of plates/distance between plates)*((60% depth of effluent)*(dielectric constant of effluent)+(40% depth of solids)*(dielectric constant of solids)).

Oil warnings and alarms are derived from oil depths. The dielectric constant of oil is approximately 1-10 in normal operating conditions. The effluent dielectric constant is 80+ in normal operating conditions. This significant difference in dielectric enables the depth of the oil to be detected. As oil increases, the oil floats to the top of the effluent and increases downwards. The top of the sensor is at least 50 mm above the effluent depth. In the case where multiple capacitors are used in the sensor, oil depths are measured based on the upper set of capacitors. Each capacitor is a known length and the depth of oil is known based on the number of capacitors that are surrounded with oil and the next lowest capacitor (S2) that is partially surrounded. A calculation of the oil depth can be generated by calculating the summation of the length of each capacitor and the estimated percentage coverage of oil from the capacitance reading on the partially oil surrounded capacitors (upper most and lowest oil reading capacitors). Oil warnings and alarms will occur when oil depth is at least 3 inches above entry to the baffle aligned. It is to be understood that several methods may be used to calculate oil depths including various combinations of temperature, estimated dielectric constants of effluent, estimated dielectric constants of oil, estimated dielectric constant of gas and "in use" durations.

Solids and oil warnings and alarms are based on depths of solids and oils in conjunction with effluent depth of the OWTS tank. It is to be understood that a number of methods may be used to calculate tank effluent depth including the sensor alignment in the tank, the baffle the sensor is aligned to, the maximum level the wastewater reaches with respect to the sensor, rate of change of effluent, solids, and oil, and inputs from the installer. This estimation is calculated every time the tank is pumped and refined. Solids and oil warnings and alarms will occur when the combined percentage of solid levels and oil levels surpass a percentage of the total effluent level of the tank. For example, if solid levels are measured at 250 mm, oil levels measured at 250 mm and total effluent level of the tank was measured at 1250 mm, the solids and oil level would be 40% of the tank. Industry standard is to have a tank pumped when the solids and oil levels surpass 25% of the tank.

An output blockage alarm occurs when the effluent level on the sensor currently partially surrounded with oil and effluent measures an increase in effluent. This may occur with roots or soil blocking the output baffle, the output baffle filter clogged, the leach field full, a crushed distribution pipe, biomat formation in leach field, leach field compaction, and/or leach field soil-mineral bonding. It is to be understood that several methods may be used to calculate output blockage including various combinations of temperature, estimated dielectric constants of effluent, estimated dielectric constants of oil, estimated dielectric constant of gas (in tank), oil depths, effluent depths, solids depths, and "in use" durations.

A leak warning occurs when the rate of change (decrease) in effluent depths surpasses a threshold that does not correspond with "in use" durations. Leak warnings could also be misconstrued as detrimental materials in wastewater. Continued decreases in effluent depths over longer time periods may be considered to differentiate the two. It is to be understood that several methods may be used to calculate a leak in OWTS including various combinations of temperature, statistical analysis of capacitance readings across plate capacitors over time, oil depths, effluent depths, solids depths, "in use" durations, and hydraulic retention.

Detrimental chemicals warning occurs when capacitance measurements across most capacitors change. Capacitors that were previously surrounded with oils are now showing partially surrounded and capacitors that were previously surrounded with effluent are now partially surrounded with oils. This would be representative of a higher than normal quantity of detergents resulting in oils no longer separating. It is to be understood that several methods may be used to calculate detrimental chemicals including various combinations of temperature, statistical analysis of capacitance readings across plate capacitors, oil depths, effluent depths, solids depths, "in use" durations, and hydraulic retention.

Detrimental usage warning occurs when rate of oil depths changes beyond a threshold value over a rolling time period. If there is a large influx of grease/oils at one time, this may be that the home owner is flushing grease/oil down the drains into the OWTS tank. For example, if oil depths change by more than 5 inches over a 7 day time period, a warning will occur. It is to be understood that several methods may be used to calculate detrimental materials in OWTS including various combinations of temperature, statistical analysis of capacitance readings across plate capacitors over time, oil depths, effluent depths, solids depths, "in use" durations, and hydraulic retention.

Another detrimental usage warning occurs when rate of solids depths changes beyond a threshold value over a rolling time period. If the rate of change of solids depths is well above or below the normal, this may be because medicines are being flushed into the OWTS tank. For example, cancer medications increase the solidification rate of the solids and anti-biotics kill the anaerobic bacteria causing the suspended solids to never solidify. It is to be understood that several methods may be used to calculate detrimental usage including various combinations of temperature, statistical analysis of capacitance readings across plate capacitors, oil depths, effluent depths, solids depths, "in use" durations, and hydraulic retention.

Hydraulic retention warnings and alarms occurs when "in use" durations surpass thresholds at certain depths solids and oils over a rolling time period. This could also mean that the tank chosen during the OWTS design phase was incorrectly sized. Threshold is determined based on calibration values recorded during "tank filling" state, based on effluent depth changes given "in use" durations. This threshold is a representation of the quantity of wastewater produced. Preset estimations of quantity of solids exiting the tank from wastewater produced and solid and oil depths in the tank are generated from lab testing and randomly monitored units in the field. It is to be understood that several methods may be used to calculate hydraulic retention including various combinations of "in use" durations, estimated effluent depth of the tank, and estimated rate of effluent change. Setting thresholds for quantity of solids exiting the tank will be new to the industry and will provide insights for predictive maintenance of downstream components.

Another method of hydraulic retention would be to use the current industry standard. Currently, hydraulic retention is calculated by effective tank volume divided by daily wastewater volume. Normal retention times are 1-3 days. In this case, the equation would be changed to estimated effluent depth/daily wastewater in inches per day. For example, if "in use" durations is noted for 20 times with a duration of 30 minutes each time creating an estimated 10 inches of change in effluent depths over a 1 day time period and the tank was estimated to be 40 inches deep this would mean a retention of 4 days. This would be acceptable and would not provide a warning.

Each of the "notification states" and "transition states" provide information to the user. Once the "state" is calculated, the connectivity module will connect to the internet. With an active internet connection, the device will publish a notification to the cloud which will notify the homeowner, municipalities, and the onsite maintainers that the OWTS in question needs maintenance.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A waste management system for sensing depths of mixed waste material, including one or more liquids, one or more solids, and one or more gases in a hazardous environment, the system comprising:
   two or more capacitor sensors, wherein each capacitor sensor of the two or more capacitor sensors measures at least two material depths of the mixed waste material including liquid depths in the mixed waste material, oil depths in the mixed waste material, and solid depths in the mixed waste material,
   wherein each capacitor sensor comprises of:
      two or more substantially planar conductive plates at a specified distance from each other, wherein the specified distance is based on at least one of a dielectric constant of encountered liquids and solids, applied voltage limits, applied current limits, applied frequency limits, an area of the planar conductive plates, and an entry space for solid materials to surround the planar conductive plates.

2. A waste management system of claim 1, wherein sets of capacitor sensors are connected with a hinge.

3. A waste management system of claim 1, wherein each of the planar conductive plates is made of layers of metal film/foil and/or metal sheets.

4. A waste management system of claim 1, wherein each of the capacitor sensors is shielded with Propylene, Polyvinyl Chloride (PVC), Polyethylene (PE), Chlorinated Polyethylene (CPE), Rulan, Halar (ECTFE), Polyurethane (PUR), Polyolefin, Epoxy Resin, Teflon, Tezfal, and/or Cross-linked Polyethylene (XLP/XLPE).

5. A waste management system of claim 1, wherein colored markings indicate positioning along a baffle in a waste management system tank.

6. A method of using a waste management system for determining depths of mixed waste material in a hazardous environment, the method comprising:
   receiving data regarding the mixed waste material from two or more capacitor sensors, wherein each capacitor sensor of the two or more capacitor sensors measures at least two material depths of the mixed waste material including liquid depths in the mixed waste material, oil depths in the mixed waste material, and solid depths in the mixed waste material;
   determining the overflow based on one or more of a temperature, a current state of the waste management system, a comparison against estimated dielectric constants of tank effluent, a comparison against estimated dielectric constants of tank oil, a comparison against estimated dielectric constant of tank gases, a comparison against estimated dielectric constants of tank solids, a comparison against estimated tank effluent depth, and a comparison against estimated effluent volume per change in depth; and
   generating a notification based on the determined overflow.

7. A method of claim 6, wherein the determination of the overflow is further based on at least one of the solid depths in the tank, the oil depths in the tank, and effluent depths in the tank.

8. A method of claim 6, further comprising:
   determining changes in the received data from one of the capacitor sensors for the solid depths in the mixed waste material and/or one of the capacitor sensors for the liquid depths in the mixed waste material,
   wherein the generated notification is based on the changes.

9. A method of claim 8, further comprising:
   determining a rate of change in the received data from one or more of the capacitor sensors for the liquid depths in the mixed waste material,
   wherein the generated notification is based on the rate of change.

10. A method of claim 6, further comprising:
    estimating temperature change to the received data from one or more of the capacitor sensors for the liquid depths and solid depths in the mixed waste material.

11. A method of claim 6, further comprising:
    estimating salinity change to the received data from one or more of the capacitor sensors for the liquid depths in the mixed waste material.

12. A method of claim 8, further comprising:
    determining a rate of change in the received data from one or more of the capacitor sensors for the solid depths in the mixed waste material,
    wherein the generated notification is based on the rate of change.

13. A method of claim 6, further comprising:
    determining detrimental materials based on at least one of a temperature in the tank, the oil depths in the tank, effluent depths in the tank, the solids depths in the tank, analysis of historical capacitance readings, "in use" durations, and estimated hydraulic retention of tank.

14. A method of claim 6, further comprising:
    determining a leak based on at least one of a temperature in the tank, the oil depths in the tank, effluent depths in the tank, the solids depths in the tank, analysis of historical capacitance readings, count of in-use durations, and estimated hydraulic retention of the tank.

15. A method of claim 6, further comprising:
    determining hydraulic retention based on at least one of a temperature in the tank, the oil depths in the tank, effluent depths in the tank, the solids depths in the tank, analysis of historical capacitance readings, and count of in-use durations.

* * * * *